(12) United States Patent
Kruger et al.

(10) Patent No.: US 8,990,950 B2
(45) Date of Patent: Mar. 24, 2015

(54) ENABLING GRANULAR DISCRETIONARY ACCESS CONTROL FOR DATA STORED IN A CLOUD COMPUTING ENVIRONMENT

(75) Inventors: Stephen P. Kruger, Malahide (IE); Olgierd S. Pieczul, Clonsilla (IE)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 12/979,117

(22) Filed: Dec. 27, 2010

(65) Prior Publication Data

US 2012/0167197 A1 Jun. 28, 2012

(51) Int. Cl.
| | |
|---|---|
| G06F 17/30 | (2006.01) |
| G06F 12/00 | (2006.01) |
| G06F 21/31 | (2013.01) |
| G06F 21/10 | (2013.01) |
| G06F 21/62 | (2013.01) |

(52) U.S. Cl.
CPC ............... *G06F 17/30* (2013.01); *G06F 12/00* (2013.01); *G06F 21/31* (2013.01); *G06F 21/10* (2013.01); *G06F 21/62* (2013.01)
USPC ................... 726/26; 726/27; 726/28; 726/29; 726/30; 707/781

(58) Field of Classification Search
CPC ......... G06F 17/30; G06F 21/31; G06F 21/10; G06F 21/62; G06F 12/00
USPC ....................... 726/26–30; 707/781, E17.005
See application file for complete search history.

(56) References Cited

U.S. PATENT DOCUMENTS

| | | | |
|---|---|---|---|
| 2003/0126465 | A1 | 7/2003 | Tassone et al. |
| 2003/0188198 | A1* | 10/2003 | Holdsworth et al. ......... 713/201 |
| 2007/0214144 | A1* | 9/2007 | Lawson et al. .................... 707/9 |
| 2008/0082538 | A1* | 4/2008 | Meijer et al. ...................... 707/9 |
| 2009/0228950 | A1 | 9/2009 | Reed et al. |
| 2009/0228967 | A1 | 9/2009 | Ghadegesin et al. |

(Continued)

FOREIGN PATENT DOCUMENTS

CN 20101523365 A 9/2009

OTHER PUBLICATIONS

Yu, Ting, et al., "Security Policy Testing via Automated Program Code Generation (Extended Abstract)," CSIIRW, Apr. 13-15, 2009.

(Continued)

*Primary Examiner* — Kaveh Abrishamkar
*Assistant Examiner* — Ayoub Alata
(74) *Attorney, Agent, or Firm* — Patents on Demand P.A.; Brian K. Buchheit; Scott M. Garrett

(57) ABSTRACT

Enabling discretionary data access control in a cloud computing environment can begin with the obtainment of a data request and response message by an access manager service. The response message can be generated by a data storage service in response to the data request. The access manager service can identify owner-specified access rules and/or access exceptions applicable to the data request. An access response can be determined using the applicable owner-specified access rules and/or access exceptions. Both the response message and the access response can indicate the allowance or denial of access to the requested data artifact. The access response can be compared to the response message. If the access response does not match the response message, the response message can be overridden to express the access response. If the access response matches the response message, the response message can be conveyed to the originating entity of the data request.

18 Claims, 5 Drawing Sheets

(56) References Cited

U.S. PATENT DOCUMENTS

2010/0250497 A1 9/2010 Redlich et al.
2010/0251329 A1 9/2010 Wei

OTHER PUBLICATIONS

Hu, Vincent C., et al., "Assessment of Access Control Systems," National Institute of Standards and Technology, National Interagency Report 7316, Sep. 2006.

Schwarz, SJT, et al., "Clasas: a key-store for the cloud," Proceedings 18th IEEE/ACM International Symposium on Modelling, Analysis & Simulation of Computer and Telecommunication Systems (MASCOTS 2010), 267-276. IEEE Computer Society, Los Alamitos, CA, USA.

Carminati-et al.; "Rule-Based Access Control for Social Networks"; Google; 2006.

\* cited by examiner

ENABLING GRANULAR DISCRETIONARY ACCESS CONTROL FOR DATA STORED IN A CLOUD COMPUTING ENVIRONMENT

BACKGROUND

The present invention relates to the field of cloud computing data storage and, more particularly, to enabling granular data owner-configurable access control for data stored in a cloud computing environment.

Cloud-based storage services, a cloud service specifically for data storage and/or management, allow an organization to off-load data management overhead and increase data accessibility among geographically-separated groups. Data stored in cloud storage is accessible from any computing device an authorized user is capable of connecting to the cloud storage service.

For example, a repair technician is able to access service manuals and repair reports in cloud storage from any job-site where Internet connectivity is available.

BRIEF SUMMARY

One aspect of the present invention can include a method for enabling discretionary data access control in a cloud computing environment. Such a method can begin with the obtainment of a data request and a response message for the data request by an access manager service operating in a cloud computing environment. The response message can be generated by a data storage service of the cloud computing environment in response to the data request. The response message can indicate the allowance or denial of access to a data artifact stored by the data storage service. Owner-specified access rules and/or owner-specified access exceptions applicable to the data request can be identified. An access response to the data request can be determined based upon the applicable owner-specified access rules and/or owner-specified access exceptions. The access response can indicate the allowance or denial of access to the requested data artifact. An owner-specified access rule can define parameter values that restrict access to the data artifact. An owner-specified access exception can define conditions that allow access to the data artifact that would otherwise be denied. The determined access response can then be compared to the response message. When the determined access response does not match the response message, the response message can be overridden to express the determined access response. When the determined access response matches the response message, the response message can be conveyed to the originating entity of the data request.

Another aspect of the present invention can include a system that enables discretionary data access control for a cloud storage service. Such a system can include data artifacts representing electronic data files, a cloud computing environment, a data storage cloud service, and an access manager cloud service. The cloud computing environment can include cloud service providers configured to operate in accordance with a cloud computing model. The data storage cloud service can be configured to manage storage and access of the data artifacts within the cloud computing environment. The access manager cloud service can be configured to provide discretionary access control for the data artifacts managed by the data storage cloud service. The discretionary access control can be performed in addition to access control operations executed by the data storage cloud service. The discretionary access control can be capable of countermanding access allowances and access denials made by the data storage cloud service.

Still another aspect of the present invention can include a computer program product that includes a computer readable storage medium having embedded computer usable program code. The computer usable program code can be configured to obtain a data request and a response message for the data request. The response message can be generated by a data storage service operating in a cloud computing environment in response to the data request. The response message can indicate an allowance or a denial of access to a data artifact stored by the data storage service. The computer usable program code can be configured to identify owner-specified access rules and/or owner-specified access exceptions applicable to the data request. Then, the computer usable program code can be configured to determine an access response to the data request based upon the identified owner-specified access rules and/or owner-specified access exceptions. The access response can indicate the allowance or the denial of access to the requested data artifact. An owner-specified access rule can define parameter values that restrict access to the data artifact. An owner-specified access exception can define conditions that allow access to the data artifact that would otherwise be denied. The computer usable program code can be configured to compare the determined access response to the response message. When the determined access response does not match the response message, the computer usable program code can be configured to override the response message to express the determined access response. The computer usable program code can be configured to, when the determined access response matches the response message, convey the response message to an originating entity of the data request.

Yet another aspect of the present invention can include a method for enabling discretionary data access control in a cloud storage system. Such a method can begin when a data storage cloud service of a cloud storage system receives a data request for access to a data artifact stored by the cloud storage system within a cloud computing environment. A response to the data request can be determined by the data storage cloud service, indicating the allowance or denial of access to the data artifact. An access manager cloud service can detect the data storage cloud service's receipt of the data request. The access manager cloud service can then interrupt the data storage cloud service's handling of the data request prior to an execution of the determined response. A copy of the data request and the data storage cloud service's response can be obtained by the access manager cloud service. The access manager cloud service can evaluate contents of the data request copy with respect to discretionary access controls defined for the data artifact. The discretionary access controls can be configured by an entity associated with the data artifact. A response from said evaluation of the data request copy can be determined by the access manager cloud service, indicating the allowance or denial of access to the data artifact. The access manager cloud service can then compare the response determined by the data storage cloud service with the response determined internally. When the comparison indicates disagreement between the responses of the data storage cloud service and the access manager cloud service, the access manager cloud service can override the data storage cloud service's response. When the comparison indicates agreement between the responses of the data storage cloud service and the access manager cloud service, the access manager cloud service can release the interruption to the data storage cloud service's handling of the data request, allowing the data storage cloud service to complete fulfillment of the data request.

DETAILED DESCRIPTION

Figure 1:
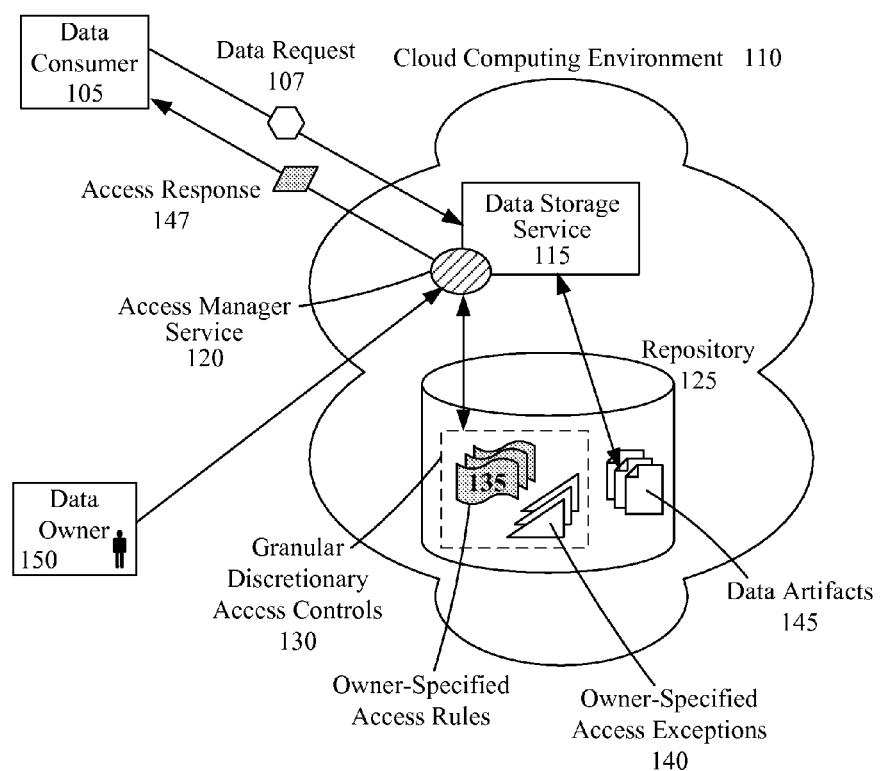
FIG. 1 is a conceptual process flow diagram depicting the enablement of a granular discretionary access control for data artifacts to which access is provided for using a data storage service in a cloud computing environment in accordance with embodiments of the inventive arrangements disclosed herein.

While data security is always a concern for data storage and data transmissions, controlling access to or the visibility of the stored data by other users and/or organizations is often limited for a data owner (i.e., authoring user, organization). Since cloud services are typically designed to accommodate a wide range of user types and needs, the features and/or capabilities of the cloud service are often basic or general in nature. As such, the type of access control (i.e., access control lists, user groups, role-based access, etc.) available in a cloud storage service is relatively simplistic, when compared to the enterprise-level data management systems that many organizations are accustomed.

Every organization utilizing the cloud storage service is limited to the same access controls. While a role-based access control approach may work for a large organization, it can be overly-complex for a smaller organization. Likewise, a user group-based approach appropriate for a small-medium organization can be unworkable for a large enterprise.

Further, an organization's data stored by the cloud storage service is subject to the visibility and/or access rules of the service provider. In the event that the cloud storage service provider changes their visibility/access rules, access to an organization's data can be compromised.

The present invention discloses a solution for enabling discretionary data access control for data artifacts handled by a data storage cloud service in a cloud computing environment. The data storage cloud service can manage storage and access of data artifacts. An access manager cloud service can apply a set of discretionary access controls to dynamically adjust the allowance or denial of access to a data artifact determined by the data storage cloud service. Discretionary access controls can be represented by owner-specified access rules and owner-specified access exceptions. An owner-specified access rule can define parameter values that restrict access to the data artifact. An owner-specified access exception can define conditions that allow access to the data artifact that would otherwise be denied.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a conceptual process flow diagram 100 depicting the enablement of a granular discretionary access control 130 for data artifacts 145 to which access is provided for using a data storage service 115 in a cloud computing environment 110 in accordance with embodiments of the inventive arrangements disclosed herein.

In process flow 100, a data consumer 105 can send a data request 107 for a data artifact 145 to a data storage service 115 operating in a cloud computing environment 110. A data consumer 105 can correspond to a human user and/or computing entity requesting access to a specified data artifact 145. A data artifact 145 can represent a variety of data stored in an electronic format (i.e., text file, image file, audio file, multimedia file, etc.).

The data request 107 can be an electronic message identifying the requesting data consumer 105 and the data artifact 145 to be accessed. The data request 107 can also include a variety of other messaging information, such as the Internet protocol (IP) address of the requesting data consumer 105, action being performed by the data consumer 105, a timestamp of the data request 107, and so on, depending upon the message format and/or data storage service 115.

The cloud computing environment 110 can represent a hardware/software computing environment configured in accordance with the cloud computing model. The cloud computing environment 110 can enable on-demand access to a shared pool of configurable computing resources like repository 125. A cloud computing environment 110 can be realized as a private cloud (i.e., owned by a sole organization), a community cloud (i.e., shared by multiple sympathetic organizations), a public cloud (i.e., available to the public or a large group), or a hybrid cloud (i.e., a configuration of multiple cloud types).

The data storage service 115 can represent a cloud service specifically configured to manage the storage and access of data artifacts 145 in its associated cloud repository 125. The data storage service 115 and repository 125 can represent what is commonly referred to as a cloud storage system or cloud storage service. In addition to simple storage of data artifacts 145, data storage service 115 can also include a variety of data management functions like file sharing, version control, and online collaboration.

The data storage service 115 can determine whether to allow or deny the data request 107. However, unlike in a typical data storage service 115 implementation, an access manager service 120 can interrupt the provision of the data artifact 145 by the data storage service 115 to check if the provision of the data artifact 145 is allowed based upon a granular discretionary access control 130, herein referred to as discretionary access control 130.

The access manager service 120 can represent a cloud service configured to act as an independent mechanism enabling the performance of the discretionary access control 130 upon data artifacts 145 provided by the data storage service 115. That is, the access manager service 120 can adjust the provision of a data artifact 145 to a data consumer 105 by the data storage service 115 based upon the parameters defined in the discretionary access control 130.

For example, the discretionary access control 130 can be used to restrict access to a specific data artifact 145 to only three users 105, even if the data storage service 115 would normally provide the data artifact 140 to other users 105.

The discretionary access control 130 can represent configurable parameters that can be set to allow and/or deny access to data artifacts 145 at the discretion of the data artifact's 145 data owner 150. The data owner 150 can represent an authoring user or organization of a data artifact 145 or a user having the authorization to act on behalf of the authoring user/organization.

For example, a data administrator of the authoring organization can be given the task to manage the discretionary access control 130 for all data artifacts 145, despite not being the authoring user of the data artifacts 145.

The discretionary access control 130 can include owner-specified access rules 135 and owner-specified access exceptions 140. The owner-specified access rules 135, herein referred to as access rules 135, can represent conditions that restrict access to data artifacts 145. The owner-specified access exceptions 140, herein referred to as access exceptions 140, can express authorized exceptions to the access rules 135. An access rule 135 can be meant as standard policy, whereas an access exception 140 can represent an occasional and/or temporary allowance contrary to the standard policies.

Parameters for both the access rules 135 and access exceptions 140 can utilize data fields contained within the data request 107, metadata defined for the data artifacts 145, and/or data elements utilized by the data storage service 115 (e.g., usernames, user roles, access levels, etc.).

Once the access manager service 120 has ascertained whether the data request 107 should be allowed/denied, the access manager service 120 can determine if the provision of the data artifact 145 by the data storage service 115 should be overridden or continue. Depending upon this determination, the access manager service 120 can send the data consumer 105 the appropriate access response 147 (i.e., access granted/denied).

To illustrate the differences between conventional approaches and that provided by the discretionary access control 130, let us use the example of an external entity 105 requiring one-time access to view a data artifact 145 typically restricted to internal users 105.

Using a conventional cloud data storage service 115, the external entity 105 can be assigned the appropriate level of access for the data artifact 145 using the available access control mechanism of the data storage service 115 (i.e., assign the external entity 105 with the appropriate role). Doing so, however, will then provide the external entity 105 with unlimited access to all data artifacts 145 available to that access level—an undesirable situation should other sensitive internal data artifacts 145 share that access level.

Instead, we could attempt to define a new role/group using the access control mechanism of the data storage service 115 that can only access the specific data artifact 145. While a better option, the access control mechanism most likely will be defined in broad terms and will not support restrictions to the type of actions that the external entity 105 is able to perform upon the data artifact 145. Thus, this approach, while limiting the access of the external entity 105 to the specific data artifact 145, cannot ensure that the external entity 105 will only be able to view the data artifact 145.

With both of these options, the data owner 150 must remember to remove or deactivate the access for the external entity 105 from access control mechanism of the data storage service 115 once the access session is determined to be complete.

Another popular means for handling this type of situation can be to electronically provide a copy (i.e., email, file transfer) of the data artifact 145 to the external entity 150. In this instance, the data owner 150 relinquishes control over the data artifact 145; the external entity 105 can distribute and/or modify the data artifact 145 without limitation. This option can be detrimental to the organization should the external entity 105 mishandle the data artifact 145.

Alternately, the inherent file security features of a UNIX or UNIX-like operating system can be used for the data storage service 115. A UNIX or UNIX-like operating system can associate protection bits with a stored data artifact 145 that define read/write/execute permissions for a file owner, the group to which the owner belongs, and all other users. While this feature would allow for the actions the external entity 105 can perform regarding the data artifact 145, this option can incur other access-related problems.

Firstly, most organizations utilize an INTEL-based operating system, which can cause interoperability issues with attempting to store the data artifacts 145 with a different operating system. Secondly, changing the protection bits to change permissions can only be performed by the actual author (user who created the data artifact 145) or system administrator. With this being a cloud-based data storage service 115, the data owners 150 may not be afforded any ability to execute operating system-based commands.

Even if these issues are overcome, this approach can have other performance-related shortcomings. Protection bits cannot be used to support access control mechanisms in which a data consumer 105 and/or data owner 150 can be a member of multiple groups. Further, the group to which the data consumer 105 belongs cannot differ from that of the data owner 150 to be assigned the group permissions. A proxy other than a system administrator cannot be used to make permission changes. Lastly, once a protection bit is changed, the change can affect the access of all members of the group without discrimination.

Using the access manager service 120, the restriction of the data artifact 145 to internal users can be represented as an access rule 135, since this is a standard access policy for this and/or other data artifacts 145. The need to access the data artifact 145 by the external entity 105 can be defined as an access exception 140. The access exception 140 can be written specific to the identifier of the external entity 105, limit the allowable actions to view only, and allow only a single access session.

Further, with this approach, the data artifact 145 can remain safely stored in the repository 125; the external entity 105 cannot store a local copy. The standard access policy for the data artifact 145 represented by the access rule 135 can remain intact. Once the access manager service 120 executes the access exception 140, the access exception 140 can be deactivated to prevent further access of the data artifact 145 by the external entity 105.

With this approach, the following capabilities can be provided in a cloud computing environment 110:
  organization-specific "Denied Party Lists" based upon data access regulations/restriction of the organization's country of operation, regardless of what country the repository 125 resides
  minimization of data leakage should the data storage service 115 become compromised or alter their internal access/visibility rules
  the ability for a cloud data storage service 115 to host an organization's Intranet Cloud computing environment 110 can include any hardware/software/and firmware necessary to convey data encoded within carrier waves. Data can be contained within analog or digital signals and conveyed though data or voice channels. Cloud computing environment 110 can include local components and data pathways necessary for communications to be exchanged among computing device components and between integrated device components and peripheral devices. Cloud computing environment 110 can also include network equipment, such as routers, data lines, hubs, and intermediary servers which together form a data network, such as the Internet. Cloud computing environment 110 can also include circuit-based communication components and mobile communication components, such as telephony switches, modems, cellular communication towers, and the like. Cloud computing environment 110 can include line based and/or wireless communication pathways.

As used herein, presented repository 125 can be a physical or virtual storage space configured to store digital information. Repository 125 can be physically implemented within any type of hardware including, but not limited to, a magnetic disk, an optical disk, a semiconductor memory, a digitally encoded plastic memory, a holographic memory, or any other recording medium. Repository 125 can be stand-alone storage units as well as a storage unit formed from a plurality of physical devices. Additionally, information can be stored within repository 125 in a variety of manners. For example, information can be stored within a database structure or can be stored within one or more files of a file storage system, where each file may or may not be indexed for information searching purposes. Further, repository 125 can utilize one or more encryption mechanisms to protect stored information from unauthorized access.

Figure 2:
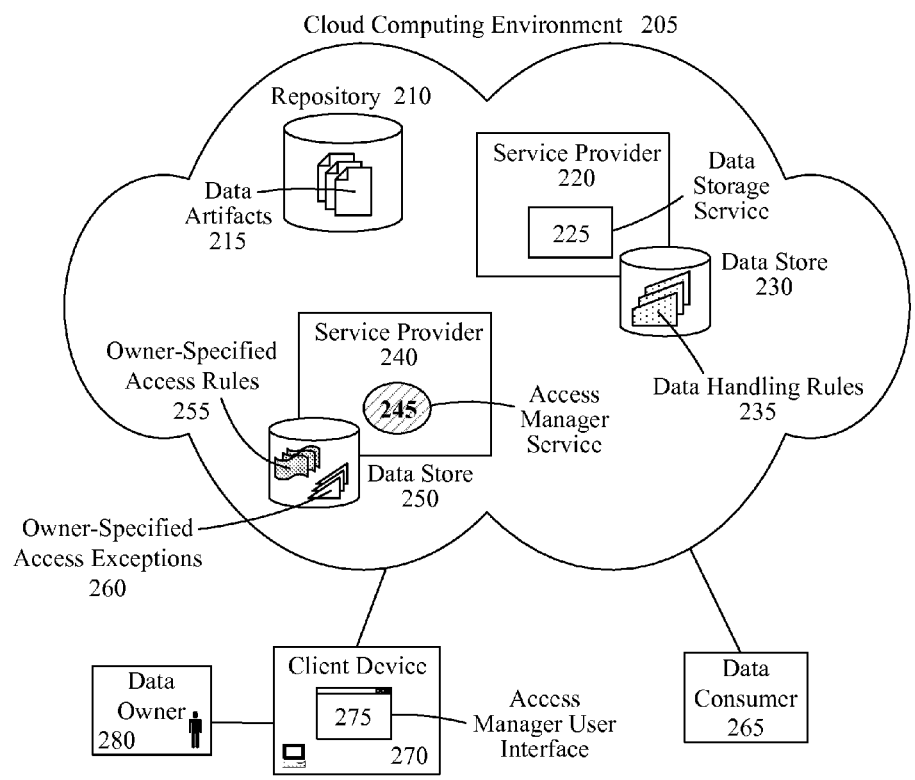
FIG. 2 is a schematic diagram illustrating a system that provides granular discretionary access control for a data storage service operating in a cloud computing environment in accordance with an embodiment of the inventive arrangements disclosed herein.

FIG. 2 is a schematic diagram illustrating a system 200 that provides granular discretionary access control for a data storage service 225 operating in a cloud computing environment 205 in accordance with embodiments of the inventive arrangements disclosed herein. System 200 can be utilized within the context of process flow 100.

In system 200, data artifacts 215 can be stored by a data storage service 225 within a repository 210 of a cloud computing environment 205. The data owner 280 of a data artifact 215 can utilize owner-specified access rules 255, herein referred to as access rules 255, and/or owner-specified access exceptions 260, herein referred to as access exceptions 260, of an access manager service 245 to define discretionary access controls for data consumers 265 seeking access to the data artifact 215.

The data owner 280 can represent the authoring user or originating organization of a data artifact 215 or a user having the authorization to act on behalf of the authoring user/organization. A data consumer 265 can correspond to a human user and/or computing entity (i.e., other cloud service) requesting access to a specified data artifact 215. A data artifact 215 can represent a variety of data stored in an electronic format (i.e., text file, image file, audio file, multimedia file, etc.).

The cloud computing environment 205 can represent a configuration of hardware/software components implementing cloud computing models. Generally, a cloud computing environment 205 can include the hardware/software components that support the provision of cloud services over the Internet, such as servers, data stores, and software applications.

In this example, the cloud computing environment 205 can include a repository 210 for storage of the data artifacts 215, a service provider 220 for the data storage service 225, and a service provider 240 for the access manager service 245.

It should be noted that additional repositories 210 and/or service providers 220 and/or 240 as well as other cloud services provided by the service providers 220 and/or 240 can be included within the cloud computing environment 205 without departing from the spirit of this embodiment of the present disclosure.

It is also important to note that, since a cloud computing environment 205 is Internet-based, any computer networks (e.g., public, private, WAN, LAN, etc.) required for communication between the various components of system 200 can be included as part of the cloud computing environment 205 and not illustrated as separate entities.

Service providers 220 and 240 can represent the hardware and/or software components necessary to support operation of their respective services 225 and 245. In another contemplated embodiment, both the data storage service 225 and access manager service 245 can be provided by the same service provider 220 or 240.

In system 200, each service provider 220 and 240 can be shown having a separate data store 230 and 250, respectively. It should be noted that the use of data stores 230 and 250 is to illustrate the logical separation of data elements specific to each cloud service 225 and 255 and is not intended as an expression of required implementation. In the implementation of system 200, the contents of data stores 230 and/or 250 can be stored in repository 210 and/or another such repository 210 accessible by the corresponding service provider 220 or 240. That is, the contents of data stores 230 and 250 can be stored upon any repository 210 contained in the cloud computing environment 205 that is accessible by the service providers 220 or 240.

The data storage service 225 can represent a cloud service configured to manage the storage and access of data artifacts 215 in the cloud repository 210. In addition to the storage of data artifacts 215, data storage service 225 can also include a variety of data management functions like file sharing, version control, and online collaboration.

The data storage service 225 can determine whether to allow or deny access to a data artifact 215 based upon a set of data handling rules 235 specific to the data storage service 225. The data handling rules 235 can represent data access requirements and/or regulations imposed by governmental bodies or organizations applicable to the location of the service provider 220, repository 210, data owner 280, and/or data consumer 265.

For example, a data storage service 225 for medical data that is based in the UNITED STATES can have data handling rules 235 that ensures that data artifacts 215 handled by the data storage service 225 are in compliance with the Health Insurance Portability and Accountability Act (HIPAA).

The access manager service 245 can represent a cloud service configured to act as an independent mechanism that can further restrict access via access rules 255 or allow a dispensation via access exceptions 260 to the data artifacts 215 provided by the data storage service 225 at the discretion of the data owner 280. The access manager service 245 can, therefore, be capable of overriding the decision of the data storage service 225 when providing access to a data artifact 215 that is subject to access rules 255 and/or an access exception 260.

As previously discussed, an access rule 255 can be meant as a representation of a standard policy, whereas an access exception 260 can represent an occasional and/or temporary exemption to the policies embodied by the data handling rules 235 of the data storage service 225 and/or the access rules 255 of the access manager service 245.

It should be emphasized that the management and execution of the access rules 255 and access exceptions 260 occurs independent of the operation of the data storage service 225. That is, the access manager service 255 can perform its operations after the data storage service 225 has completed its operation. The data storage service 225 can operate without any awareness of the actions of the access manager service 255. Thus, functionality of the access manager service 255 can be applied to current data storage services 225 without requiring an architectural and/or system change within the cloud computing environment 205.

In another embodiment, the access manager service 255 can be invoked by the data storage service 225 as final stage of access control prior to providing access to the requested data artifact 215.

The parameters used to express the access rules 255 and access exceptions 260 can utilize data fields contained within the data request received by the data storage service 225 from the data consumer 265, metadata defined for the data artifacts 215, and/or data elements utilized by the data storage service 225.

Examples of these parameters can include, but are not limited to, username, email address, email domain, IP address, type of data artifact 215, user role, type of action being performed, confidentiality level of the data artifact 215, time of day the request is received, request routing, and the like.

The data owner 280 can define access rules 255 and/or access exceptions 260 using an access manager user interface 275 running on a client device 270. The client device 270 can represent a variety of computing devices capable of running the access manager user interface 275 and communicating with the cloud computing environment 205.

The access manager user interface 275 can represent a graphical user interface (GUI) in which the data owner 280 can be presented with configurable mechanisms for defining access rules 255 and/or access exceptions 260. The access manager user interface 275 can be further configured to utilize security measures to limit access to or use of data items and/or features.

For example, a role-based approach can be used in order to limit the creation of access exceptions 260 to data owners 280 having the role of "administrator". Further, different roles can be used to limit the type of access rules 255 that a data owner 280 can create and/or modify.

It should be noted that the access manager user interface 275 is not used for interacting with the data storage service 225. Interaction with the data storage service 225 would utilize a user interface (not shown) associated with the data storage service 225.

Cloud computing environment 205 can include any hardware/software/and firmware necessary to convey data encoded within carrier waves. Data can be contained within analog or digital signals and conveyed though data or voice channels. Cloud computing environment 205 can include local components and data pathways necessary for communications to be exchanged among computing device components and between integrated device components and peripheral devices. Cloud computing environment 205 can also include network equipment, such as routers, data lines, hubs, and intermediary servers which together form a data network, such as the Internet. Cloud computing environment 205 can also include circuit-based communication components and mobile communication components, such as telephony switches, modems, cellular communication towers, and the like. Cloud computing environment 205 can include line based and/or wireless communication pathways.

As used herein, presented repository 210 and data stores 230 and 250 can be a physical or virtual storage space configured to store digital information. Repository 210 and data stores 230 and 250 can be physically implemented within any type of hardware including, but not limited to, a magnetic disk, an optical disk, a semiconductor memory, a digitally encoded plastic memory, a holographic memory, or any other recording medium. Repository 210 and data stores 230 and 250 can be stand-alone storage units as well as a storage unit formed from a plurality of physical devices. Additionally, information can be stored within repository 210 and data stores 230 and 250 in a variety of manners. For example, information can be stored within a database structure or can be stored within one or more files of a file storage system, where each file may or may not be indexed for information searching purposes. Further, repository 210 and/or data stores 230 and/or 250 can utilize one or more encryption mechanisms to protect stored information from unauthorized access.

Figure 3:
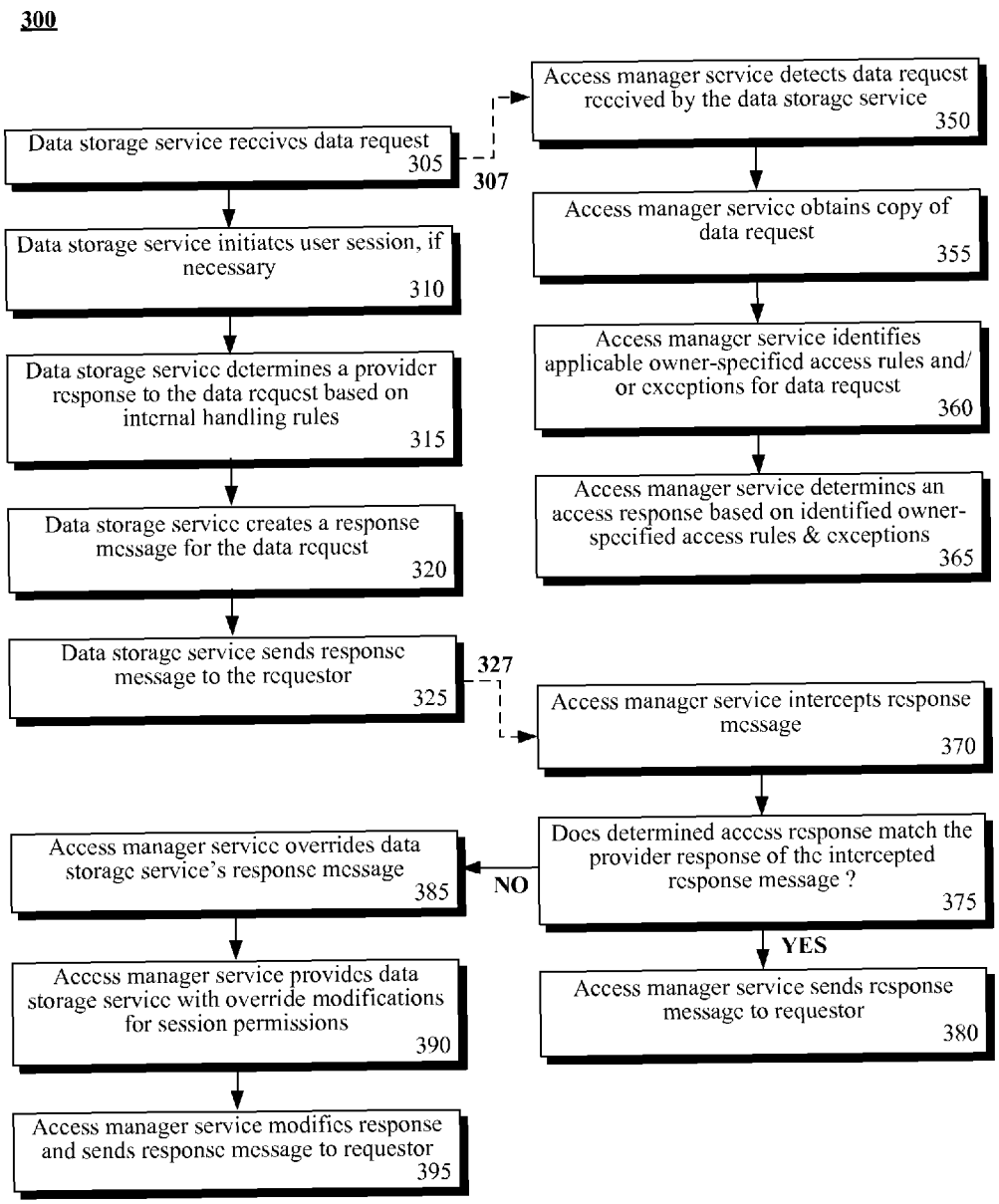
FIG. 3 is a flow chart of a method detailing, in general, the function of the access manager service with respect to the data storage service to enable discretionary access control in accordance with an embodiment of the inventive arrangements disclosed herein.

FIG. 3 is a flow chart of a method 300 detailing, in general, the function of the access manager service with respect to the data storage service to enable discretionary access control in accordance with embodiments of the inventive arrangements disclosed herein. Method 300 can be performed within the context of process flow 100 and/or system 200.

Method 300 can illustrate a series of steps 305-325 performed by the data storage service and a second set of steps 350-395 executed by the access manager service as triggered in response to steps 305 and 325 performed by the data storage service. For the sake of simplicity, the portion of method 300 pertaining to the data storage service will be discussed first, followed by those steps of the access manager service.

Steps 305-325 of method 300 can represent a typical handling of a data request by the data storage service. In step 305, the data storage service can receive a data request from a data consumer. If necessary, a user session for the data consumer can be initiated by the data storage service in step 310.

In step 315, the data storage service can determine a provider response (i.e., allow, deny) to the data request based on its internal handling rules. It should be noted that the term "provider response" is used to differentiate between the response determined by the data storage service and the response determined by the access manager service, referred to by the term "access response".

The data storage service can then create a response message for the data request in step 320. In step 325, the response message can be sent by the data storage service to the requestor (data consumer).

The execution of step 305 by the data storage service can trigger the performance of step 350 by the access manager service, as indicated by dashed line 307. In step 350, the access manager service can detect that the data storage service has received a data request, such as through the use of a listener component or by querying the data storage service's message queue.

A copy of the data request can be obtained by the access manager service in step 355. In step 360, owner-specified access rules and/or exceptions can be identified by the access manager service as applicable to the data request. An access response for the data request can then be determined by the access manager service based upon the identified access rules and/or exceptions in step 365.

Step 370 can be performed by the access manager service in response to the execution of step 325 by the data storage service. In step 370, the access manager service can intercept the response message sent by the data storage service. The access manager service can determine if the access response that it determined matches the provider response of the intercepted response message in step 375.

When the responses match (i.e., both services agree that the requestor should or should not have access), step 380 can execute where the access manager service sends the response message to the requestor (i.e., releases the intercepted response message).

When the responses do not match, the access manager service can override the response message of the data storage service in step 385. The point at which step 385 is performed, there can exist two possible situations—the access manager service wants to deny access being allowed by the data storage service or allow access being denied by the data storage service.

In either situation, step 390 can be performed where the access manager service can provide the data storage service with the necessary override modifications for the requestor's session permissions. The access manager service can then modify the response of the response message and send the response message to the requestor in step 395.

Figure 4:
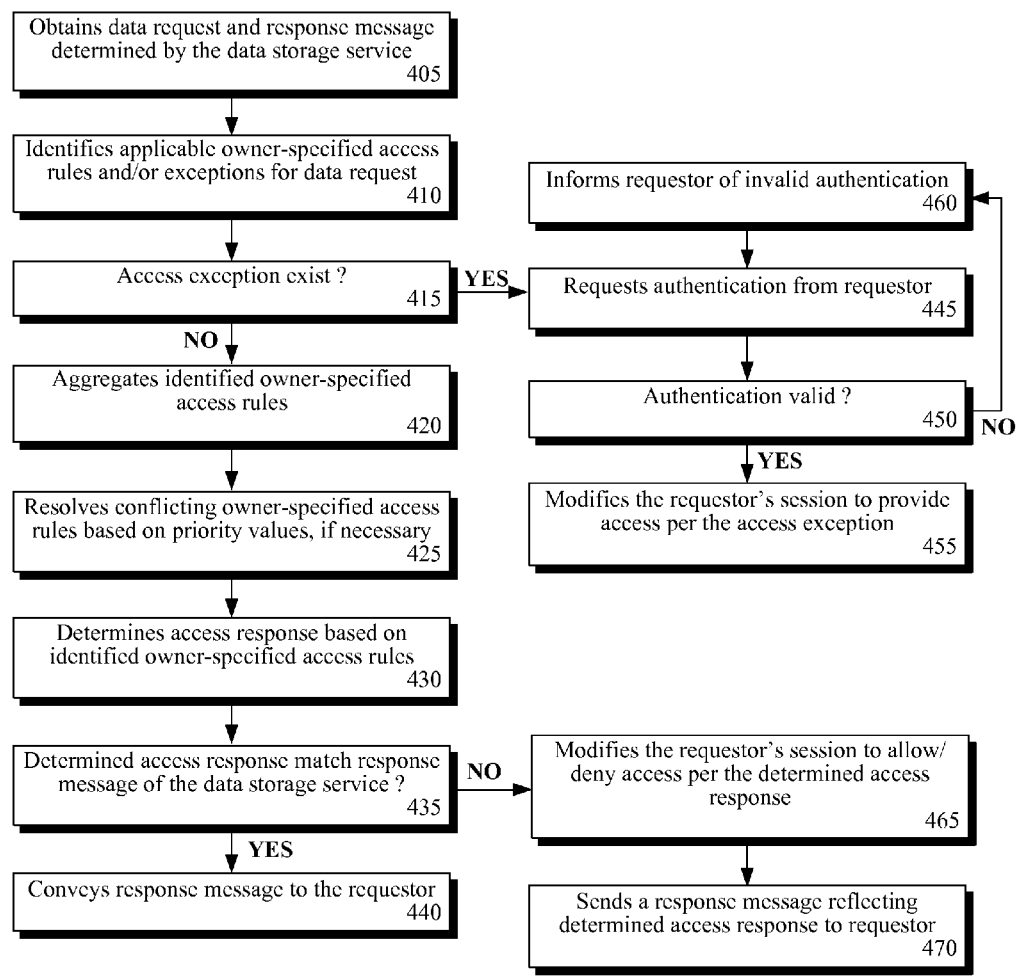
FIG. 4 is a flow chart of a method describing operation of the access manager service in accordance with embodiments of the inventive arrangements disclosed herein.

FIG. 4 is a flow chart of a method 400 describing operation of the access manager service in accordance with embodiments of the inventive arrangements disclosed herein. Method 400 can be performed within the context of process flow 100, system 200 and/or in conjunction with method 300.

Method 400 can begin in step 405 where the access manager service can obtain the data request and response message determined by the data storage service. The owner-specified access rules and/or exceptions can be identified for the data request in step 410.

In step 415, it can be determined if an access exception exists for the data request. When an access exception does not exist, the identified access rules can be aggregated in step 420.

Since access rules can be created by separate users, exist at varying levels of granularity, and/or apply to different parameters, the potential can exist for access rules to conflict with each other. The access manager service can utilize a priority value to establish which access rule should take precedence. This priority value can be used in step 425 to resolve conflicts between identified access rules, if necessary.

In step 430, the access response can be determined based upon the identified access rules. It can be determined if the determined access response matches that of the response message from the data storage service in step 435.

When the determined access response matches the response message, step 440 can execute where the response message is conveyed to the requestor (data consumer). When the determined access response does not match the response message, the requestor's session can be modified to allow or deny access per the determined access response in step 465. In step 470, a response message reflecting the determined access response can be sent to the requestor.

When it is determined that an access exception exists in step 415, flow of method 400 can proceed to step 445 where the access manager service can request authentication from the requestor. Authentication for the access exception can be an additional security stage, and can be recommended for sensitive or proprietary data artifacts.

Authentication can take a variety of forms, including, but not limited to a challenge/response format, a single-use password, a digital token, authentication parameters stored on a smart card, manual authorization of the session by an administrator, a biometric reading, a combination of authentication forms, and the like.

The validity of the authentication can be determined in step 450. When the requestor supplies valid authentication, step 455 can execute where the access manager service can modify the requestor's session in accordance with the access exception.

When invalid authentication is supplied by the requestor, the requestor can be informed of the invalid authentication in step 460. From step 460, flow can return to step 445 where authentication is requested again.

Figure 5:
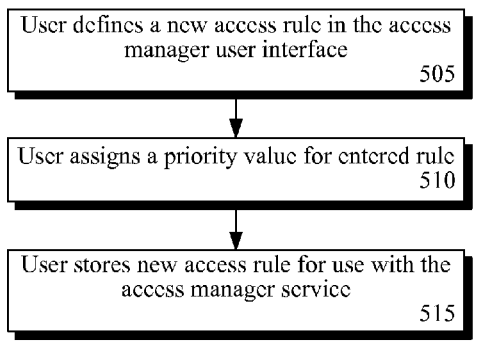
FIG. 5 is a collection of flow charts for methods detailing use of the access manager service by a data owner in accordance with embodiments of the inventive arrangements disclosed herein.
Figure 5:
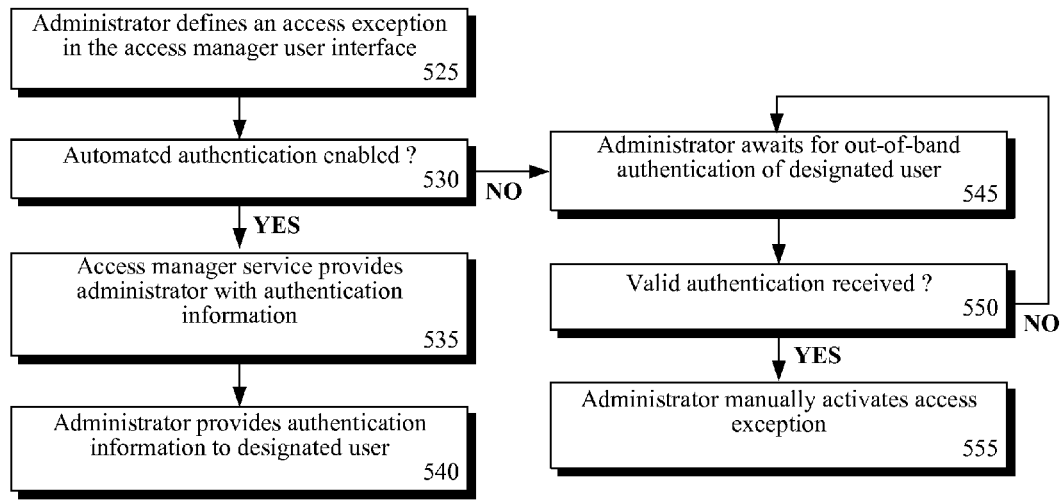

FIG. 5 is a collection of flow charts for methods 500 and 520 detailing use of the access manager service by a data owner in accordance with embodiments of the inventive arrangements disclosed herein. Methods 500 and/or 520 can be performed within the context of process flow 100, system 200, and/or in conjunction with methods 300 and/or 400.

In method 500, a user can define a new access rule using the access manager user interface in step 505. A priority value can then be assigned to the entered access rule in step 510.

Alternately, the access manager service can be configured to automatically perform step 510, assigning priority values based upon the user creating the access rule. For example, access rules created by administrator-level users can be automatically assigned a higher priority value than access rules created by team-level users, and so on.

In step 515, the new access rule can be stored for use with the access manager service.

Method 520 can describe creation of an access exception. Method 520 can begin in step 525 where an administrator can define an access exception in the access manager user interface. It can be determined if automated authentication (i.e., authentication information automatically generated by the access manager service) is enabled in step 530.

The type of automated authentication used by the access manager service can be expanded to encompass strong authentication, an authentication approach requiring two or more means of identification. For example, the access manager service can generate a temporary password and a challenge/response set. The requestor must correctly enter both the password and the response in order to gain access.

When automated authentication is enabled, the access manager service can provide the administrator with authentication information in step 535. In step 540, the administrator can provide the authentication information to the designated user for which access is being granted. From step 540, the access manager service can go on to electronically authenticate the designated user, as in steps 445 and 450 of method 400.

When automated authentication is not enabled, step 545 can execute where the administrator can wait for out-of-band authentication of the designated user. For example, the designated user can contact the administrator and verbally provide identifying information (i.e., address, data of birth, social security number).

The receipt of valid authentication can be determined in step 550. When the received authentication is valid, the administrator can manually activate the access exception for the access manager service in step 555. When the received authentication is invalid, flow of method 520 can return to step 545 where the administrator can continue to wait for valid authentication.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
one or more processors;
one or more non-transitory storage mediums comprising program instructions able to be executed by the one or more processors;
a plurality of data artifacts representing electronic data files, wherein the data artifacts are stored in one or more non-transitory storage mediums;
a cloud computing environment comprising a plurality of cloud service providers configured to operate in accordance with a cloud computing model;
a data storage cloud service, comprising at least a subset of the program instructions, configured to manage storage and access of the plurality of data artifacts within the cloud computing environment;
an access manager cloud service, comprising at least a subset of the program instructions, configured to provide discretionary access control to the plurality of data artifacts managed by the data storage cloud service, wherein said discretionary access control is performed in addition to access control operations executed by the data storage cloud service, and wherein the discretionary access control of the access manager cloud service is capable of countermanding access allowances and access denials made by the data storage cloud service, wherein the access manager cloud service further comprises:

a plurality of owner-specified access rules defining at least one parameter value that restricts access to a data artifact of the plurality of data artifacts; and a plurality of owner-specified access exceptions defining conditions allowing access to the data artifact, wherein the access is denied by at least one of the data storage service and at least one owner-specified access rule; and an authentication mechanism configured to validate authentication information associated with an owner-specified access exception, wherein receipt of valid authentication data by the access manager cloud service enables access to the data artifact.

2. The system of claim 1, wherein the data storage cloud service further comprises:

a plurality of data handling rules defining limitations for access of the plurality of data artifacts, wherein the data storage cloud service utilizes said plurality of data handling rules to determine at least one of an access allowance and an access denial for a data consumer requesting access to the data artifact.

3. The system of claim 1, wherein the authentication mechanism is further configured to automatically generate the authentication information.

4. The system of claim 1, wherein the authentication mechanism is configured to utilize a strong authentication process.

5. The system of claim 1, further comprising:

an access manager service user interface configured to allow definition of the plurality of owner-specified access rules and the plurality of owner-specified access exceptions.

6. A computer program product comprising a computer readable storage medium having computer usable program code embodied therewith, the computer usable program code comprising:

computer usable program code stored on a non-transitory storage medium, configured to obtain a data request and a response message for the data request, wherein the response message is generated by a data storage service operating in a cloud computing environment in response to the data request, wherein the response message indicates at least one of an allowance and a denial of access to a data artifact stored by the data storage service;

computer usable program code stored on a non-transitory storage medium, configured to identify an existence of at least one of at least one owner-specified access rule and at least one owner-specified access exception applicable to the data request;

computer usable program code stored on a non-transitory storage medium, configured to determine an access response to the data request, wherein the access response is determined by an access manager service based upon the identified at least one owner-specified access rule and at least one owner specified access exception, wherein said access response indicates at least one of the allowance and the denial of access to the data artifact requested in the data request, and wherein an owner specified access rule defines at least one parameter value that restricts access to the data artifact, and wherein an owner-specified access exception defines conditions allowing access to the data artifact, wherein the access is denied by at least one of the data storage service and at least one owner-specified access rule;

computer usable program code stored on a non-transitory storage medium, configured to compare the determined access response to the response message;

computer usable program code stored on a non-transitory storage medium, configured to, if the determined access response does not match the response message, override the response message to express the determined access response; and computer usable program code stored on a non-transitory storage medium, configured to, if the determined access response matches the response message, convey the response message to an originating entity of the data request.

7. The computer program product of claim 6, wherein, if the identification results in the existence of an owner-specified access exception, the computer program product further comprises:

computer usable program code stored on a non-transitory storage medium, configured to request authentication data from the originating entity of the data request;

computer usable program code stored on a non-transitory storage medium, configured to, upon receipt of the authentication data, validate said authentication data; and computer usable program code stored on a non-transitory storage medium, configured to, if the authentication data is determined valid, immediately override the response message to express the owner-specified access exception.

8. The computer program product of claim 7, further comprising:

computer usable program code stored on a non-transitory storage medium, configured to, if the authentication data is determined invalid, inform the originating entity of the data request of the invalid authentication data; and computer usable program code stored on a non-transitory storage medium, configured to repeat the requesting and validating of authentication data from the originating entity, wherein access to the data artifact is denied until at least one of a receipt of valid authentication data, a termination of a session created by the data storage service associated with the data request, and an expiration of a predefined time limit.

9. The computer program product of claim 6, wherein computer usable program code to determine the access response further comprises:

computer usable program code stored on a non-transitory storage medium, configured to aggregate the at least one identified owner specified access rule;

computer usable program code stored on a non-transitory storage medium, configured to identify an existence of a conflict within the aggregate of owner-specified access rules, wherein at least two owner-specified access rules are considered to be in conflict if parameters of the at least two owner-specified access rules are mutually exclusive;

computer usable program code stored on a non-transitory storage medium, configured to, if the conflict exists, resolve said conflict using priority values associated with each owner-specified access rule identified as in conflict, wherein an owner-specified access rule having a highest priority value is used over owner specified access rules having lower priority values, wherein the owner-specified access rules having the lower priority values are removed from the aggregate of owner-specified access rules;

computer usable program code stored on a non-transitory storage medium, configured to compare data values from the data request that correspond to parameter values expressed by the aggregate of owner-specified access rules;

computer usable program code stored on a non-transitory storage medium, configured to, if said comparison indicates that the data values satisfy the parameter values, set the access response as the denial of access to the data artifact; and computer usable program code stored on a non-transitory storage medium, configured to, if said comparison indicates that the parameters are unsatisfied by the data values, set the access response as the allowance of access to the data artifact.

10. A computer program product comprising a computer readable storage medium having computer usable program code embodied therewith, the computer usable program code comprising:

computer usable program code stored on a non-transitory storage medium, configured to receive of a data request by a data storage cloud service of a cloud storage system, wherein said data request requests access to a data artifact stored by the cloud storage system within a cloud computing environment;

computer usable program code stored on a non-transitory storage medium, configured to determine of a response to the data request by the data storage cloud service, wherein said determination indicates at least one of allowing access and denying access to the data artifact;

computer usable program code stored on a non-transitory storage medium, configured to detect of the data storage cloud service's receipt of the data request by an access manager cloud service;

computer usable program code stored on a non-transitory storage medium, configured to interrupt of the data storage cloud service's handling of the data request prior to an execution of the determined response by the access manager cloud service;

computer usable program code stored on a non-transitory storage medium, configured to obtain of a copy of the data request and the data storage cloud service's response by the access manager cloud service;

computer usable program code stored on a non-transitory storage medium, configured to evaluate of contents of the copy of the data request by the access manager cloud service with respect to discretionary access controls defined for the data artifact, wherein said discretionary access controls are configured by an entity associated with the data artifact;

computer usable program code stored on a non-transitory storage medium, configured to determine of response from said evaluation of the data request copy by the access manager cloud service, wherein said determination indicates at least one of allowing access and denying access to the data artifact;

computer usable program code stored on a non-transitory storage medium, configured to compare of the response determined by the data storage cloud service with the response internally determined by the access manager cloud service;

computer usable program code stored on a non-transitory storage medium, configured to, if said comparison indicates disagreement between the responses of the data storage cloud service and the access manager cloud service, override of the data storage cloud service's response by the access manager cloud service, wherein the response determined by the access manager cloud service is given precedence over the response determined by the data storage cloud service; and computer usable program code stored on a non-transitory storage medium, configured to, if said comparison indicates agreement between the responses of the data storage cloud service and the access manager cloud service, release of the interruption to the data storage cloud service's handling of the data request by the access manager cloud service, wherein the data storage cloud service is allowed to complete fulfillment of the data request.

11. The system of claim 1, wherein each of the electronic data files is one of a text file, an image file, an audio file, and a multimedia file.

12. The system of claim 1, wherein the system receives a data request from a remotely located computer of a data consumer, wherein the data request is for accessing the data artifact, wherein the data request per requirements imposed by the system comprises at least one of an Internet protocol (IP) address of the data consumer, an action being performed by the data consumer, and a timestamp of the data request.

13. The system of claim 1, wherein the cloud computing environment is one of a private cloud environment, a community cloud environment, a public cloud environment, and a hybrid cloud environment.

14. The system of claim 1, wherein the access manager cloud service is further configured to interrupt functioning of the data storage service based on the discretionary access control.

15. The system of claim 1, wherein the data storage cloud service invokes the access manager cloud service as a final stage access control operation prior to providing data artifacts to a data consumer.

16. The system of claim 12, wherein the owner-specified access exception access is further configured to:

request authentication data from an originating entity of the data request, wherein the originating entity is the data consumer;

upon receipt of the authentication data, validate said authentication data; and if the authentication data is determined valid, immediately override the response message to express the owner-specified access exception.

17. The system of claim 16, wherein the owner-specified access exception access is further configured to:

if the authentication data is determined invalid, inform the originating entity of the data request of the invalid authentication data; and repeat the requesting and validating of authentication data from the originating entity, wherein access to the data artifact is denied until at least one of a receipt of valid authentication data, a termination of a session created by the data storage service associated with the data request, and an expiration of a predefined time limit.

18. The system of claim 16, wherein the access manager cloud service is further configured to:

aggregate the at least one identified owner specified access rule;

identify an existence of a conflict within the aggregate of owner-specified access rules, wherein at least two owner-specified access rules are considered to be in conflict if parameters of the at least two owner-specified access rules are mutually exclusive; and if the conflict exists, resolve said conflict using priority values associated with each owner-specified access rule identified as in conflict, wherein an owner-specified access rule having a highest priority value is used over owner specified access rules having lower priority values, wherein the owner-specified access rules having the lower priority values are removed from the aggregate of owner-specified access rules.

\* \* \* \* \*